United States Patent
Badiger et al.

(10) Patent No.: US 12,487,313 B2
(45) Date of Patent: Dec. 2, 2025

(54) METHODS AND SYSTEMS FOR LOCALIZING A TARGET DEVICE RELATIVE TO A VEHICLE

(71) Applicant: Harman International Industries, Incorporated, Stamford, CT (US)

(72) Inventors: Praveen Badiger, Ingolstadt (DE); Kumar Balijepalli Sita Rama Subramanya, Bangalore (IN); Praveenkumar Emani, Bangalore (IN)

(73) Assignee: Harman International Industries, Incorporated, Stamford, CT (US)

( * ) Notice: Subject to any disclaimer, the term of this patent is extended or adjusted under 35 U.S.C. 154(b) by 456 days.

(21) Appl. No.: 17/994,709

(22) Filed: Nov. 28, 2022

(65) Prior Publication Data

US 2024/0175968 A1    May 30, 2024

(51) Int. Cl.
*G01S 5/02*    (2010.01)
*B60R 25/24*   (2013.01)
*G01S 5/14*    (2006.01)

(52) U.S. Cl.
CPC .............. *G01S 5/0218* (2020.05); *G01S 5/14* (2013.01); *B60R 25/245* (2013.01); *G01S 2205/01* (2020.05)

(58) Field of Classification Search
CPC ...... G01S 5/0218; G01S 5/14; G01S 2205/01; B60R 25/245
See application file for complete search history.

(56) References Cited

U.S. PATENT DOCUMENTS

| | | | |
|---|---|---|---|
| 2018/0148051 A1* | 5/2018 | Lujan | B60W 30/18154 |
| 2020/0380742 A1* | 12/2020 | Liu | G08G 1/0969 |
| 2022/0069958 A1* | 3/2022 | Choi | H04L 5/0005 |
| 2023/0089198 A1* | 3/2023 | Choi | H04W 64/006 |
| | | | 455/456.1 |
| 2024/0114542 A1* | 4/2024 | Jain | H04W 72/51 |

* cited by examiner

*Primary Examiner* — William Kelleher
*Assistant Examiner* — Ismaaeel A. Siddiquee
(74) *Attorney, Agent, or Firm* — Burris Law, PLLC

(57) ABSTRACT

A method includes determining a plurality of target device distances between a plurality of vehicle sensor nodes of a vehicle and the target device, identifying a reference target device distance from among the plurality of target device distances based on a magnitude of the plurality of target device distances, and determining a threshold comparison distance based on the reference target device distance, a reference intranode distance, and a predetermined error distance. The method includes assigning the plurality of vehicle sensor nodes to one of a reflecting vehicle sensor node set and a non-reflecting vehicle sensor node set based on a comparison between the threshold comparison distance and the plurality of target device distances and determining a positional characteristic of the target device based on one or more target device distances associated with one or more vehicle sensor nodes from among the non-reflecting vehicle sensor node set.

20 Claims, 9 Drawing Sheets

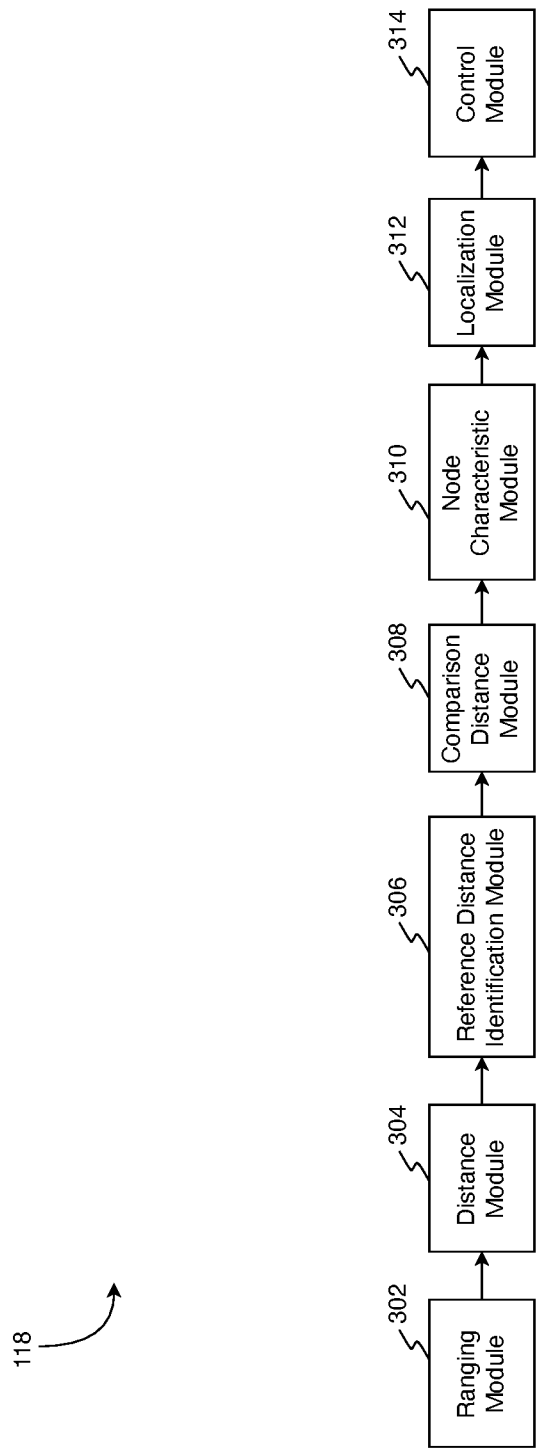

METHODS AND SYSTEMS FOR LOCALIZING A TARGET DEVICE RELATIVE TO A VEHICLE

FIELD

The present disclosure relates to systems and methods for localizing a target device relative to a vehicle.

BACKGROUND

The statements in this section merely provide background information related to the present disclosure and may not constitute prior art.

Vehicles may employ ultra-wideband (UWB) or Bluetooth low energy (BLE) transceivers to detect an operator or an object proximate the vehicle, to perform a localization routine, and to selectively provide a user access to various functions of the vehicle. However, the signals broadcasted/received by UWB/BLE transceivers may be distorted and/or reflected by one or more reflective objects within a near-line-of-sight (NLOS) environment, thereby inhibiting the accuracy of localization routines performed by the vehicle.

These issues with localization routines, among other issues with localization routines, are addressed by the present disclosure.

SUMMARY

This section provides a general summary of the disclosure and is not a comprehensive disclosure of its full scope or all of its features.

The present disclosure provides a method for localizing a target device relative to a vehicle. The method includes determining a plurality of target device distances between a plurality of vehicle sensor nodes of a vehicle and the target device, identifying a reference target device distance from among the plurality of target device distances based on a magnitude of the plurality of target device distances, and determining a threshold comparison distance based on the reference target device distance, a reference intranode distance, and a predetermined error distance. The method includes assigning the plurality of vehicle sensor nodes to one of a reflecting vehicle sensor node set and a non-reflecting vehicle sensor node set based on a comparison between the threshold comparison distance and the plurality of target device distances, determining a positional characteristic of the target device based on one or more target device distances associated with one or more vehicle sensor nodes from among the non-reflecting vehicle sensor node set, and broadcasting a command to control the vehicle based on the positional characteristic of the target device.

The following paragraphs include variations of the method for localizing a target device of the above paragraph, which may be implemented individually or in any combination.

In one embodiment, the method includes determining a plurality of intranode distances between the plurality of vehicle sensor nodes and identifying the reference intranode distance from among the plurality of intranode distances based on a magnitude of the plurality of intranode distances. In one embodiment, the threshold comparison distance is further based on a sum of the reference intranode distance, the reference target device distance, and the predetermined error distance. In one embodiment, assigning the plurality of vehicle sensor nodes to one of the reflecting vehicle sensor node set and the non-reflecting vehicle sensor node set based on the comparison between the threshold comparison distance and the plurality of target device distances further comprises: determining, for a given vehicle sensor node from among the plurality of vehicle sensor nodes, whether a given target device distance from among the plurality of target device distances is greater than the threshold comparison distance, where the given target device distance is associated with the given vehicle sensor node; and assigning the given vehicle sensor node to the reflecting vehicle sensor node set in response to the given target device distance being greater than the threshold comparison distance. In one embodiment, the method further includes assigning the given vehicle sensor node to the non-reflecting vehicle sensor node set in response to the given target device distance being less than the threshold comparison distance. In one embodiment, assigning the plurality of vehicle sensor nodes to one of the reflecting vehicle sensor node set and the non-reflecting vehicle sensor node set based on the comparison between the threshold comparison distance and the plurality of target device distances further comprises: determining, for a given vehicle sensor node from among the plurality of vehicle sensor nodes, whether a given target device distance from among the plurality of target device distances is less than the reference target device distance, where the given target device distance is associated with the given vehicle sensor node; and assigning the given vehicle sensor node to the reflecting vehicle sensor node set in response to the given target device distance being less than the reference target device distance. In one embodiment, the method further includes assigning the given vehicle sensor node to the non-reflecting vehicle sensor node set in response to the given target device distance being greater than the reference target device distance. In one embodiment, assigning the plurality of vehicle sensor nodes to one of the reflecting vehicle sensor node set and the non-reflecting vehicle sensor node set based on the comparison between the threshold comparison distance and the plurality of target device distances further comprises: initiating a ranging session; determining, during the ranging session and for a given vehicle sensor node from among the plurality of vehicle sensor nodes, whether a given target device distance from among the plurality of target device distances is one of greater than the threshold comparison distance and less than the reference target device distance, where the given target device distance is associated with the given vehicle sensor node; and assigning the given vehicle sensor node to the reflecting vehicle sensor node set in response to the given target device distance being one of less than the reference target device distance and greater than the threshold comparison. In one embodiment, the positional characteristic of the target device includes a distance between the target device and the vehicle, a trajectory of the target device, a location of the target device, or a combination thereof. In one embodiment, the plurality of vehicle sensor nodes includes a plurality of ultra-wide band (UWB) sensors. In one embodiment, the method includes controlling the vehicle based on the positional characteristic of the target device, where controlling the vehicle based on the positional characteristic of the target device further comprises providing access to one or more vehicle functions of the vehicle when the positional characteristic of the target device satisfies a positional characteristic condition. In one embodiment, the method includes controlling the vehicle based on the positional characteristic of the target device, where controlling the vehicle based on the positional characteristic of the target device further comprises performing a localization routine based on the positional characteristic of the target device.

The present disclosure provides a system for localizing a target device. The system includes a processor and a non-transitory computer-readable medium including instructions that are executable by the processor. The instructions include obtaining a reference intranode distance from among a plurality of intranode distances associated with a plurality of vehicle sensor nodes of a vehicle, determining a plurality of target device distances between the plurality of vehicle sensor nodes and the target device, identifying a reference target device distance from among the plurality of target device distances based on a magnitude of the plurality of target device distances, and determining a threshold comparison distance based on the reference target device distance, the reference intranode distance, and a predetermined error distance. The instructions include assigning the plurality of vehicle sensor nodes to one of a reflecting vehicle sensor node set and a non-reflecting vehicle sensor node set based on a comparison between the threshold comparison distance and the plurality of target device distances, determining a positional characteristic of the target device based on one or more target device distances associated with one or more vehicle sensor nodes from among the non-reflecting vehicle sensor node set, and broadcasting a command to control the vehicle based on the positional characteristic of the target device. The following includes variations of the system for localizing a target device of the above paragraph, which may be implemented individually or in any combination.

In one embodiment, the threshold comparison distance is further based on a sum of the reference intranode distance, the reference target device distance, and the predetermined error distance. In one embodiment, the instructions for assigning the plurality of vehicle sensor nodes to one of the reflecting vehicle sensor node set and the non-reflecting vehicle sensor node set based on the comparison between the threshold comparison distance and the plurality of target device distances further comprise: determining, for a given vehicle sensor node from among the plurality of vehicle sensor nodes, whether a given target device distance from among the plurality of target device distances is greater than the threshold comparison distance, where the given target device distance is associated with the given vehicle sensor node, and assigning the given vehicle sensor node to the reflecting vehicle sensor node set in response to the given target device distance being greater than the threshold comparison distance. In one embodiment, the instructions for assigning the plurality of vehicle sensor nodes to one of the reflecting vehicle sensor node set and the non-reflecting vehicle sensor node set based on the comparison between the threshold comparison distance and the plurality of target device distances further comprise: determining, for a given vehicle sensor node from among the plurality of vehicle sensor nodes, whether a given target device distance from among the plurality of target device distances is less than the reference target device distance, where the given target device distance is associated with the given vehicle sensor node; and assigning the given vehicle sensor node to the reflecting vehicle sensor node set in response to the given target device distance being less than the reference target device distance.

The present disclosure provides a method including obtaining a reference intranode distance from among a plurality of intranode distances associated with a plurality of vehicle sensor nodes of a vehicle, determining a plurality of target device distances between the plurality of vehicle sensor nodes and the target device, identifying a reference target device distance from among the plurality of target device distances based on a magnitude of the plurality of target device distances, and determining a threshold comparison distance based on the reference target device distance, the reference intranode distance, and a predetermined error distance. The method includes assigning the plurality of vehicle sensor nodes to one of a reflecting vehicle sensor node set and a non-reflecting vehicle sensor node set based on a comparison between the threshold comparison distance and the plurality of target device distances, determining a positional characteristic of the target device based on one or more target device distances associated with one or more vehicle sensor nodes from among the non-reflecting vehicle sensor node set, and broadcasting a command to control the vehicle based on the positional characteristic of the target device.

The following paragraphs include variations of the method for localizing a target device of the above paragraph, which may be implemented individually or in any combination.

In one embodiment, assigning the plurality of vehicle sensor nodes to one of the reflecting vehicle sensor node set and the non-reflecting vehicle sensor node set based on the comparison between the threshold comparison distance and the plurality of target device distances further comprises: initiating a ranging session; determining, during the ranging session and for a given vehicle sensor node from among the plurality of vehicle sensor nodes, whether a given target device distance from among the plurality of target device distances is one of greater than the threshold comparison distance and less than the reference target device distance, where the given target device distance is associated with the given vehicle sensor node; and assigning the given vehicle sensor node to the reflecting vehicle sensor node set in response to the given target device distance being one of less than the reference target device distance and greater than the threshold comparison. In one embodiment, the method includes controlling the vehicle based on the positional characteristic of the target device, where controlling the vehicle based on the positional characteristic of the target device further comprises providing access to one or more vehicle functions of the vehicle when the positional characteristic of the target device satisfies a positional characteristic condition. In one embodiment, the method includes controlling the vehicle based on the positional characteristic of the target device, where controlling the vehicle based on the positional characteristic of the target device further comprises performing a localization routine based on the positional characteristic of the target device.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various embodiments thereof, given by way of example, reference being made to the accompanying drawings, in which:

FIG. 3 illustrates an example electronic control module of the vehicle in accordance with the teachings of the present disclosure;

Figure 4A:
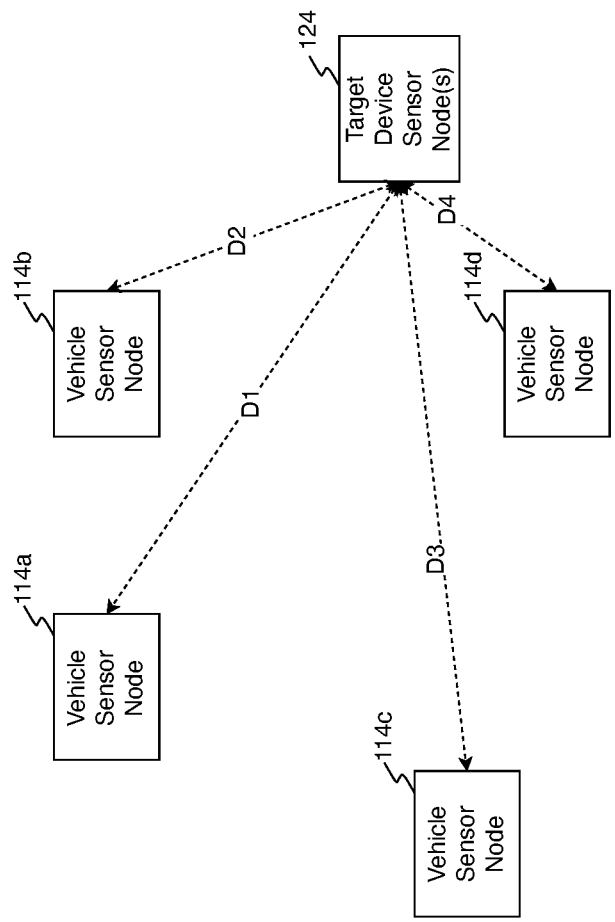
Figure 4B:
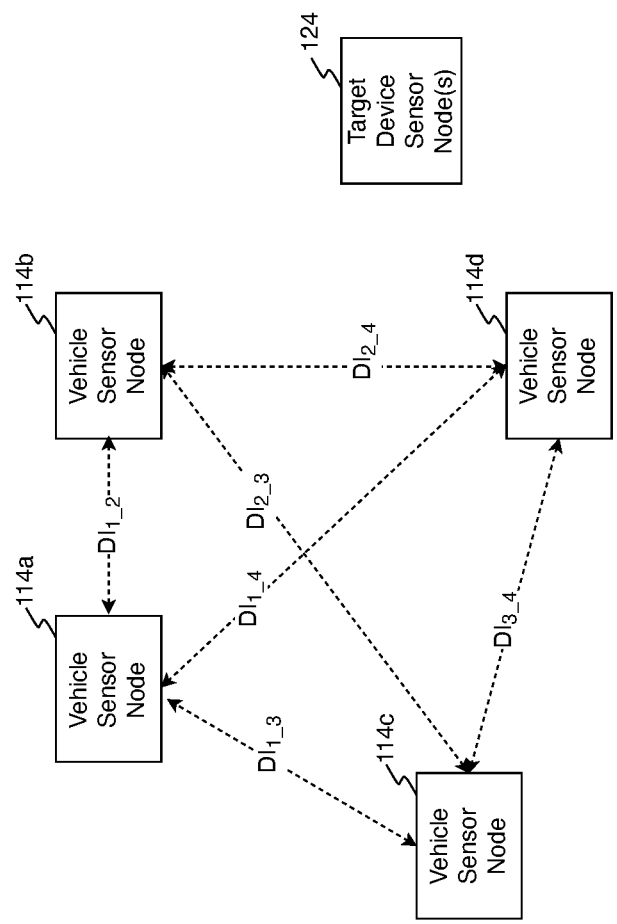
Figure 5:
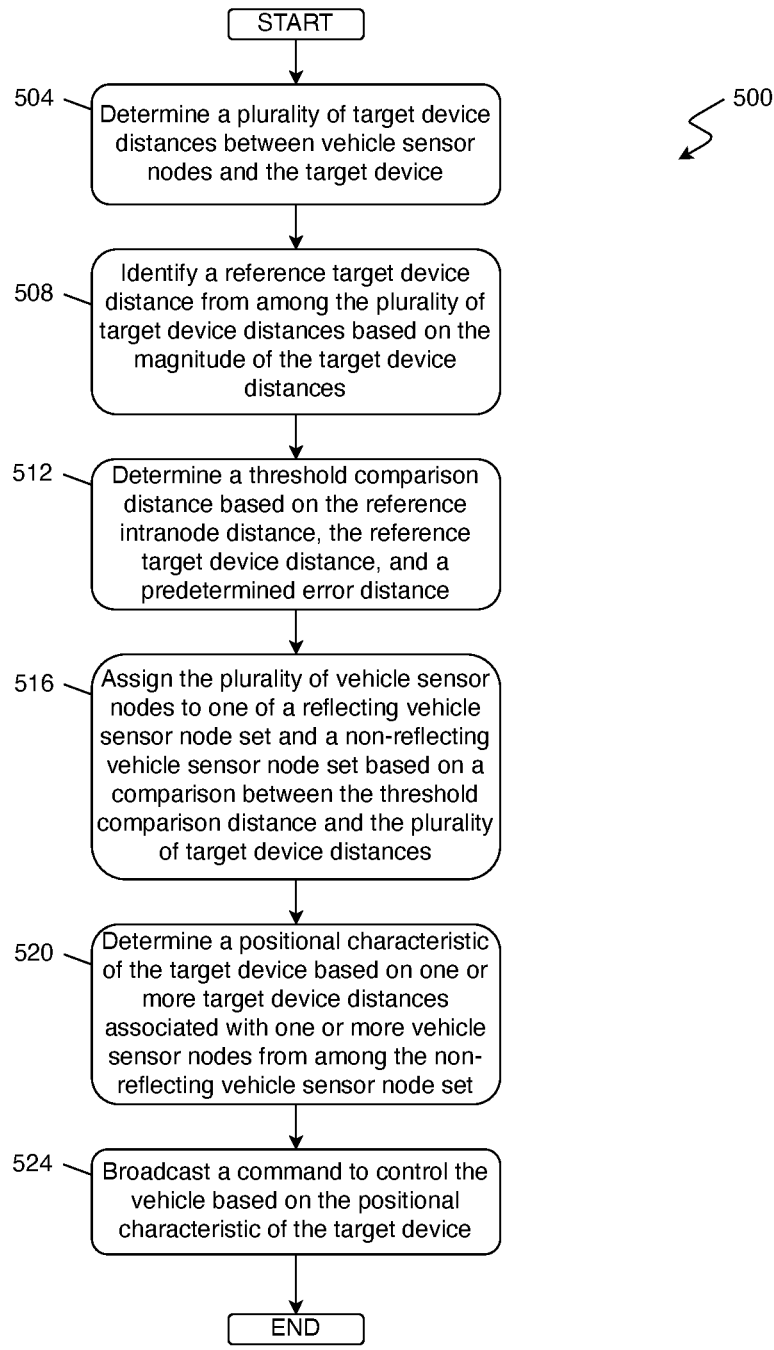
Figure 6:
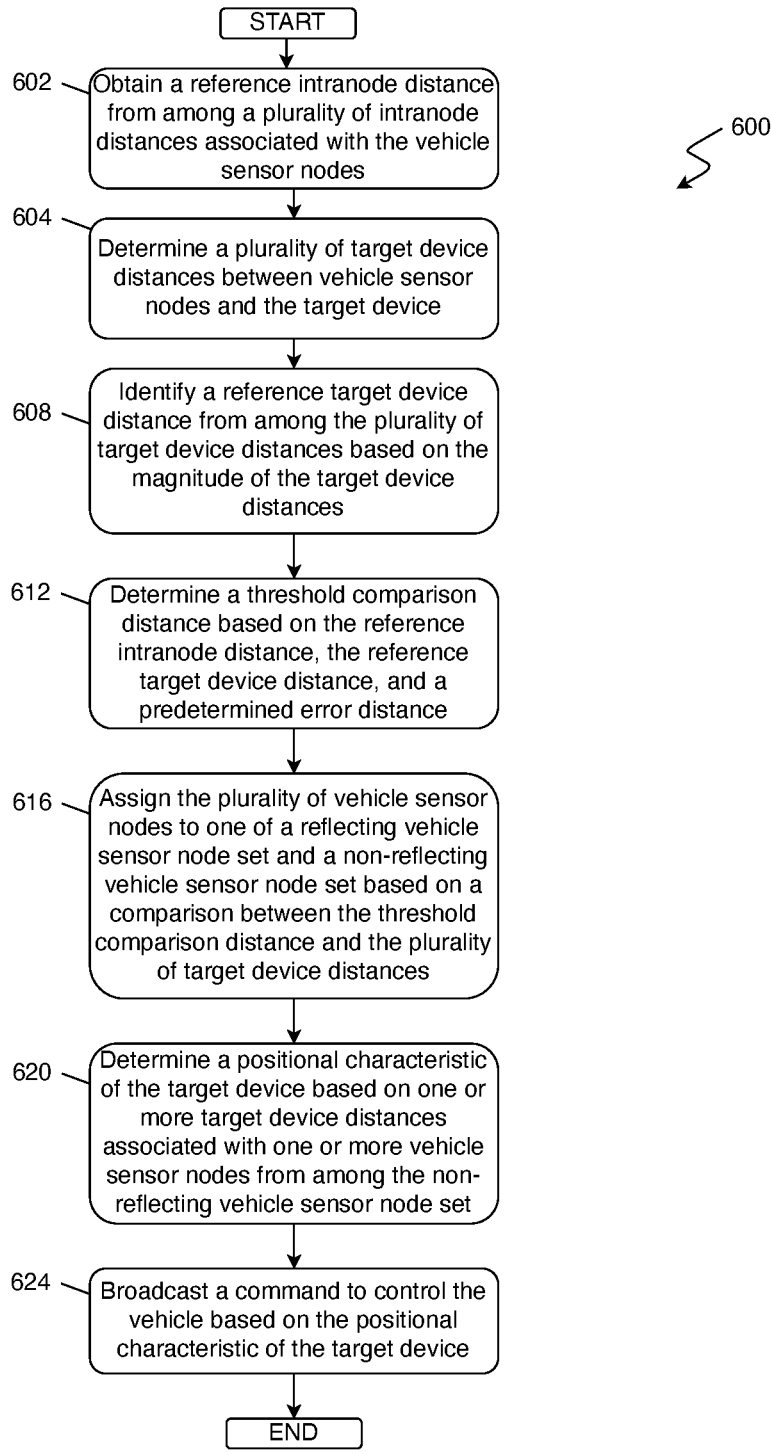
Figure 7:
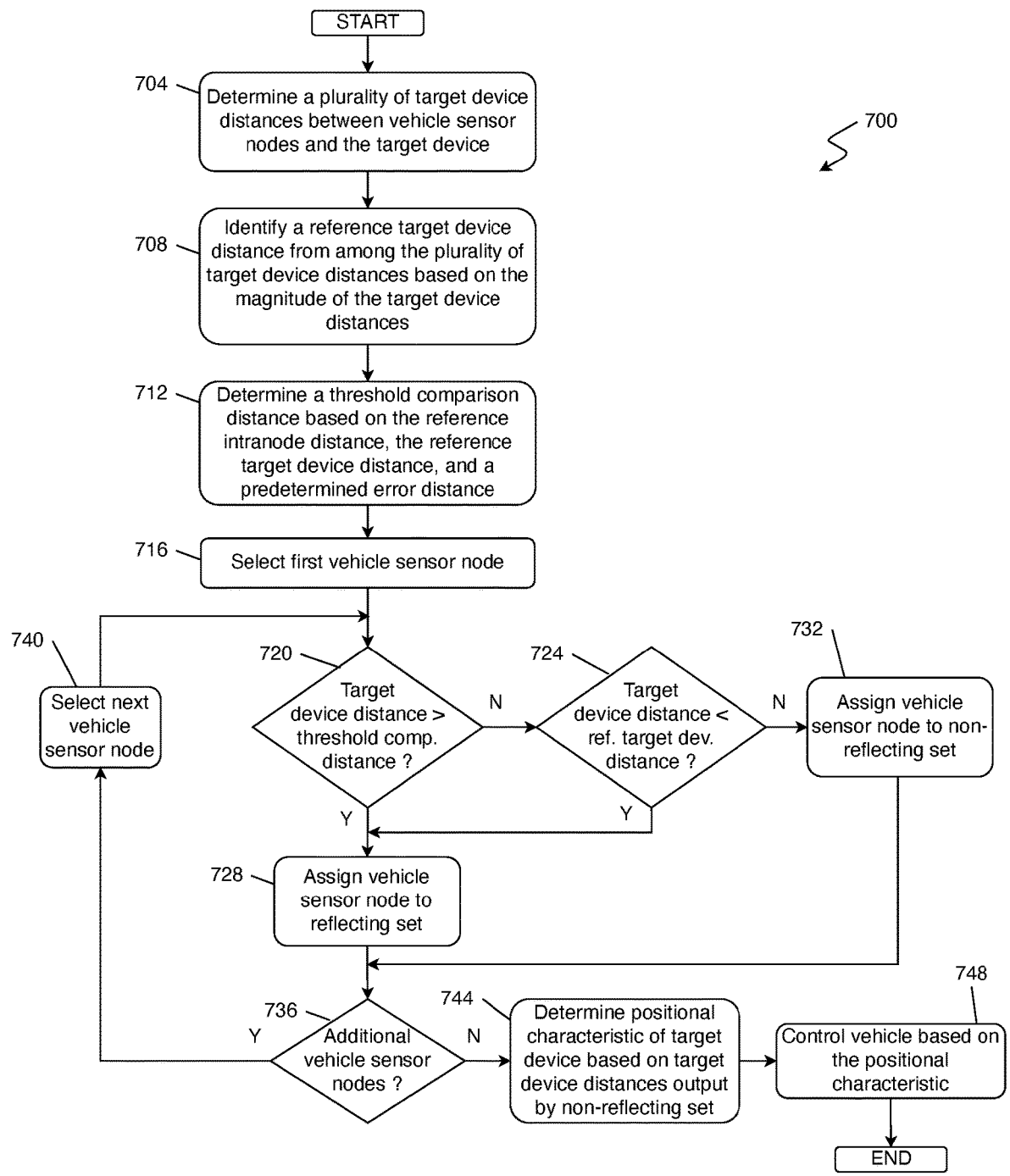
Figure 8:
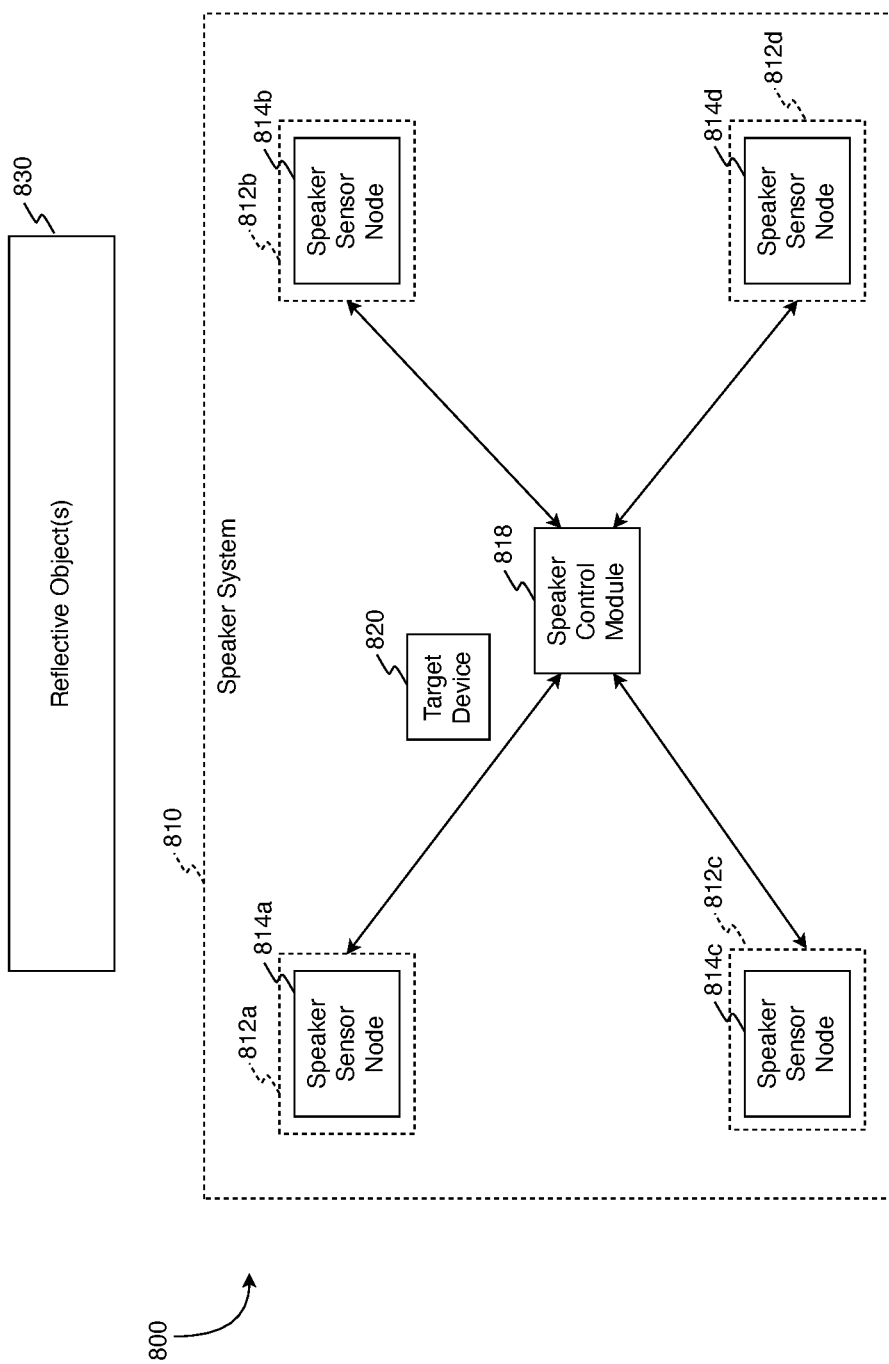

FIG. 4A schematically illustrates a plurality of target device distances between the vehicle and the target device in accordance with the teachings of the present disclosure; and FIG. 4B schematically illustrates a plurality of intranode distances of the vehicle in accordance with the teachings of the present disclosure;

FIG. 5 is a flowchart of an example control routine in accordance with the teachings of the present disclosure;

FIG. 6 is a flowchart of another example control routine in accordance with the teachings of the present disclosure;

FIG. 7 is a flowchart of yet another example control routine in accordance with the teachings of the present disclosure; and FIG. 8 illustrates a speaker system and a target device in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure relates to systems and methods for localizing a target device relative to a vehicle based on a plurality of target device distances obtained by a plurality of vehicle sensor nodes, a reference target device distance from among the plurality of target device distances, and an intranode distance associated with the vehicle sensor nodes. Specifically, one or more modules of the vehicle determine a threshold comparison distance based on, for example, a sum of the reference target device distance, a reference intranode distance, and a predetermined error distance. The one or more modules assign each of the vehicle sensor nodes to a reflecting or non-reflecting node set based on a comparison between the corresponding target device distance and the threshold comparison distance. The one or more modules then determine the distance between the target device and the vehicle, the trajectory of the target device, and/or location of the target device based on the target device distances of the set of non-reflecting vehicle sensor nodes. As such, the one or more modules improve the accuracy of the localization routines by accounting for the set of non-reflecting vehicle sensor nodes and disregarding the sensor data output by the set of reflecting vehicle sensor nodes.

Figure 1:
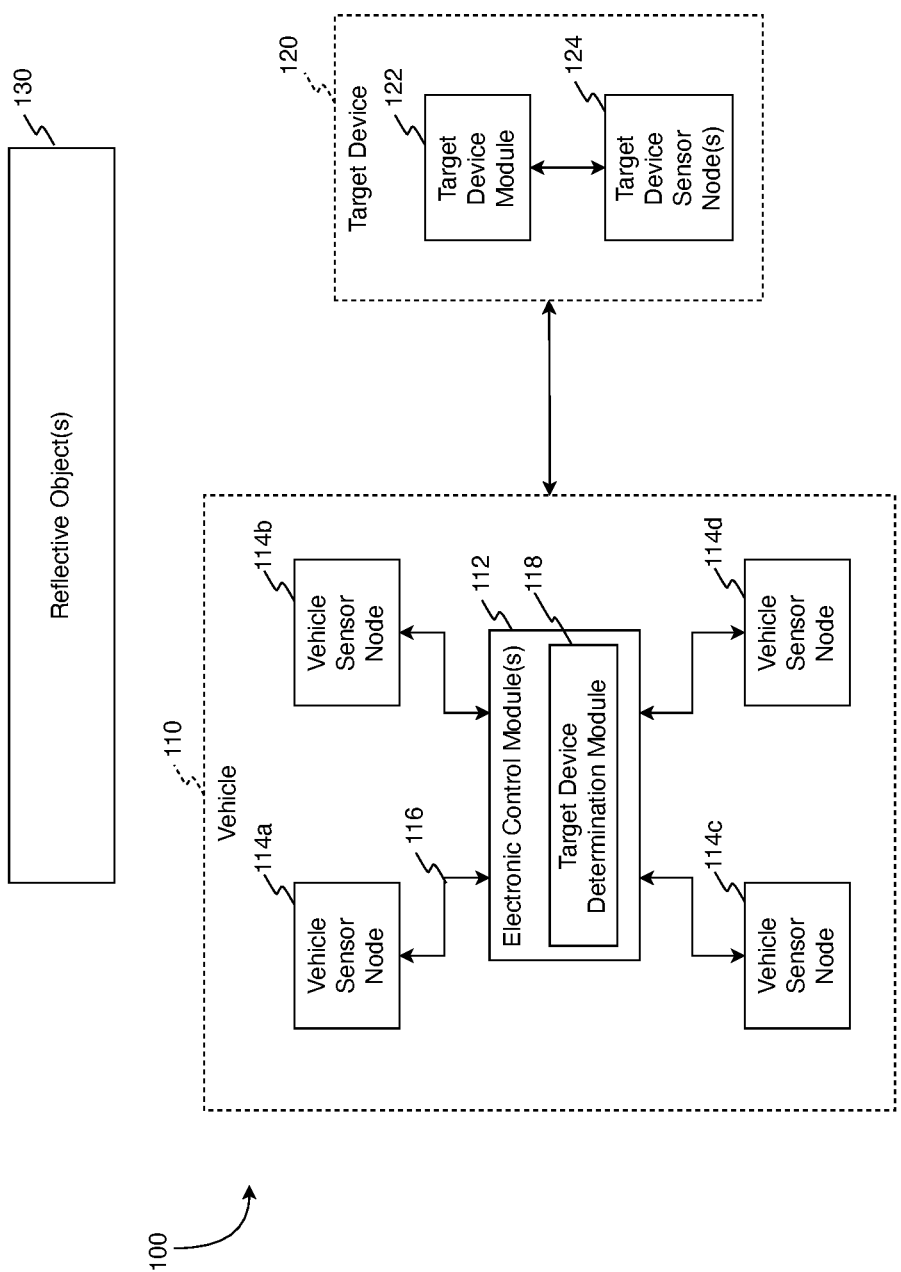
FIG. 1 illustrates a system including a vehicle and a target device in accordance with the teachings of the present disclosure.

Referring to FIG. 1, an environment 100 is shown and generally includes a vehicle 110, a target device 120, and one or more reflective objects 130. In one embodiment, the vehicle 110 includes one or more electronic control modules (ECMs) 112, vehicle sensor nodes 114a, 114b, 114c, 114d (collectively referred to hereinafter as "vehicle sensor nodes 114"), and a vehicle interface 116 that communicably couples the ECMs 112 and the vehicle sensor nodes 114. As an example, the vehicle interface 116 may include a controller area network (CAN) bus, a local interconnect network (LIN) bus, and/or a clock extension peripheral interface (CXPI) bus for exchanging data and signals between the ECMs 112 and the vehicle sensor nodes 114.

The ECMs 112 are configured to control and/or monitor a particular system or subsystem of the vehicle 110. As an example, the ECMs 112 may include a target device determination (TDD) module 118 configured to determine a positional characteristic of the target device 120 (e.g., a distance between the target device 120 and the vehicle 110, a location of the target device 120 relative to the vehicle 110, and/or a trajectory of the target device 120) and control one or more functions of the vehicle 110 based on the positional characteristic. As another example, the TDD module 118 may authenticate the target device 120 and selectively provide access to certain vehicle functions based on the authentication result (e.g., unlocking of doors, starting the vehicle 110, activating a climate control system of the vehicle 110, controlling a lighting system of the vehicle 110, among other vehicle functions). Additional details regarding the TDD module 118 are provided below with reference to FIG. 3.

Figure 2:
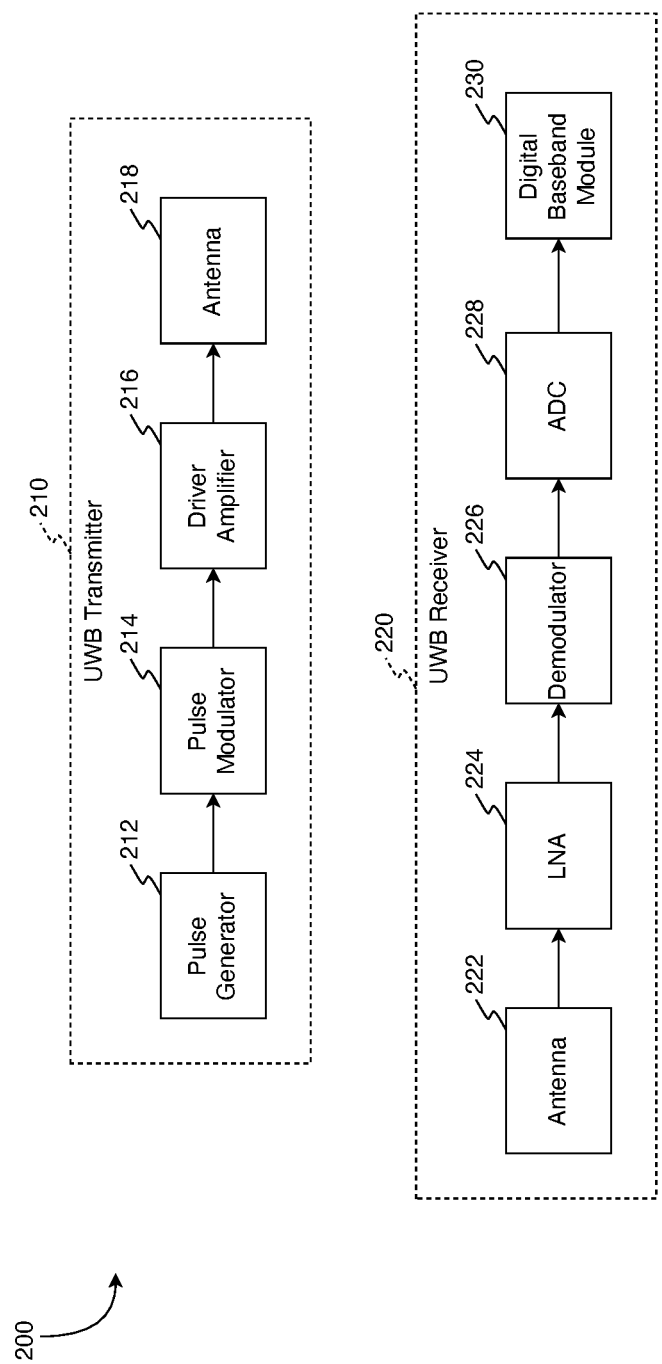
FIG. 2 illustrates one or more UWB sensors provided as vehicle sensor nodes in accordance with the teachings of the present disclosure.

In one embodiment, the vehicle sensor nodes 114 include one or more UWB sensors, WiFi-based sensors, and/or Bluetooth low energy (BLE) sensors that are disposed within the vehicle 110 or on an exterior of the vehicle 110. As an example and as shown in FIG. 2, UWB sensors 200 (as the vehicle sensor nodes 114) may include a UWB transmitter 210 and a UWB receiver 220. The UWB transmitter 210 may include a pulse generator 212 configured to generate a pulse, a pulse modulator 214 configured to modulate the pulse generated by the pulse generator 212, a driver amplifier 216 configured to amplify the modulated pulse, and an antenna 218 configured to broadcast the amplified UWB pulse. The UWB receiver 220 may include an antenna 222 configured to receive UWB pulses and reflected UWB pulses, a low noise amplifier (LNA) 224 configured to amplify the received signals, a demodulator 226 configured to demodulate the received signal, and an analog-to-digital converter (ADC) 228 configured to convert the demodulated signal into a digital signal for processing by a digital baseband module 230. It should be understood that the UWB sensors 200 may have other components and/or configurations in other embodiments and is not limited to the example described herein.

In one embodiment, the target device 120 includes a target device module 122 and one or more target device sensor nodes 124. In one embodiment, the target device 120 may be provided by any UWB-enabled, WiFi-enabled, or BLE-enabled communication device that may be associated with a user of the vehicle 110, such as an owner, driver, passenger, and/or a technician of the vehicle 110. In non-limiting examples, the target device 120 may be a smart phone, smart watch, wearable electronic device, key fob, tablet device, a computing device provided at a wireless charging station, or other device associated with the user. In one embodiment, the target device module 122 is configured to selectively broadcast a command to control one or more functions of the vehicle 110 based on the positional characteristic of the target device 120 determined by the TDD module 118. In one embodiment, the one or more target device sensor nodes 124 are similar to the vehicle sensor nodes 114 and, as such, the description thereof is omitted for brevity.

In an example application, the TDD module 118 of the vehicle 110 instructs the vehicle sensor nodes 114 (e.g., the UWB sensors 200) to transmit one or more poll signals to the target device sensor node 124 and receive one or more corresponding response signals from the target device sensor node 124. Subsequently, the TDD module 118 determines a time difference of arrival by performing a single-sided or double-sided two-way ranging routine and determines, based on the time difference of arrival, a distance between the vehicle 110 and the target device 120, the location of the target device 120, and/or the trajectory of the target device 120. It should be understood that the TDD module 118 may determine the positional characteristic of the target device 120 based on other types of data obtained by the vehicle sensor nodes 114, such as a received signal strength indicator (RSSI) of the obtained signal, an angle of arrival, a time of arrival, round trip time of flight measurements, among other types of data indicative of the positional characteristic of the target device 120.

However, the signals broadcasted/received by one or more of the vehicle sensor nodes 114 may be distorted and/or reflected by one or more reflective objects 130 that are provided within an NLOS environment. In one embodiment, the one or more reflective objects 130 are objects that include metal or other conductive materials that reflect the signals broadcasted/received by the vehicle sensor nodes 114, such as another vehicle, a building, among other reflective objects. Accordingly, the positional characteristic of the target device 120 determined by the TDD module 118 may be inaccurate due to the one or more reflective objects 130. As an example, the reflective objects 130 may reduce or increase the time difference of arrival measurements, thereby causing the TDD module 118 to determine that the target device 120 is closer to or further from the vehicle 110 than the actual distance between the target device 120 and the vehicle 110. As such, the TDD module 118 may improperly provide access to one or more vehicle functions, such as unlocking a trunk of the vehicle 110, remotely starting the vehicle 110, and activating a heating system or an air conditioning system of the vehicle 110. As described below in further detail with reference to FIG. 3, the TDD module 118 includes one or more additional modules that identify and disregard one or more of the vehicle sensor nodes 114 that generate sensor data indicative of a reflection or distortion associated with the one or more reflective objects 130.

In one embodiment and referring to FIG. 3, the TDD module 118 includes a ranging module 302, a distance module 304, a reference distance identification module 306, a comparison distance module 308, a node characteristic module 310, a localization module 312, and a control module 314. The ranging module 302 is configured to initiate a ranging session, which generally refers to activating the vehicle sensor nodes 114 to thereby obtain the positional characteristic and/or detect the target device 120. The ranging session may be initiated at predefined intervals (e.g., a first predefined interval when the target device 120 is not detected, a second predefined interval when the target device 120 is detected, among others) or at dynamic times/intervals. As an example, when the vehicle sensor nodes 114 are provided by the UWB sensor 200, the ranging module 302 instructs the UWB sensor 200 to broadcast the poll signal and listen for response signals broadcasted by the target device sensor node 124 of the target device 120.

In one embodiment, the distance module 304 determines a plurality of target device distances between the vehicle sensor nodes 114 and the target device 120 (e.g., the target device sensor node 124). As an example and as shown in FIG. 4A, the distance module 304 determines, for each of vehicle sensor nodes 114a, 114b, 114c, 114d, a corresponding target device distance $D_1$, $D_2$, $D_3$, $D_4$ based on the time difference of arrival of the response signals broadcasted by the target device sensor nodes 124. As another example, the distance module 304 may determine the target device distances by obtaining a two-dimensional or three-dimensional coordinate from each of the vehicle sensor nodes 114. Accordingly, the distance module 304 may determine the target device distances based on known position-to-distance conversion routines, a difference between the two-dimensional or three-dimensional coordinate of the vehicle sensor nodes 114, and a two-dimensional or three-dimensional coordinate of the target device 120, which may be determined by a global navigation satellite system (GNSS) module of the target device 120.

In one embodiment, the reference distance identification module 306 is configured to identify a reference target device distance from among the plurality of target device distances. In one embodiment, the reference distance identification module 306 identifies the reference target device distance based on the magnitude of the target device distances. As an example and as shown in FIG. 4A, the reference distance identification module 306 identifies the reference target device distance as target device distance $D_4$, where $D_4$ has a magnitude that is less than each of the remaining target device distances $D_1$, $D_2$, $D_3$.

In one embodiment, the comparison distance module 308 determines a threshold comparison distance based on the reference target device distance, a reference intranode distance, and a predetermined error distance. As an example, the threshold comparison distance may be provided by a sum of the reference target device distance, the reference intranode distance, and the predetermined error distance. It should be understood that the comparison distance module 308 may employ other arithmetic representations of the reference target device distance, the reference intranode distance, and the predetermined error distance to determine the threshold comparison distance and is not limited to the example described herein.

As used herein, the phrase "predetermined error distance" refers to a predetermined error value employed by the comparison distance module 308 to account for errors, noise, and other parameters that affect the target device distances measured by the vehicle sensor nodes 114. As used herein, the phrase "intranode distance" refers to one of a two-dimensional or three-dimensional distance between a pair of vehicle sensor nodes 114. As an example and as shown in FIG. 4B, the vehicle 110 includes intranode distances $DI_{1\_2}$, $DI_{1\_3}$, $DI_{1\_4}$, $DI_{2\_3}$, $DI_{2\_4}$, $DI_{3\_4}$. In one embodiment, the intranode distances are predefined by a manufacturer or operator of the vehicle 110, but it should be understood that the intranode distances may be dynamically updated by performing a single-sided or double-sided two-way ranging routine in response to, for example, a movement of one of the vehicle sensor nodes 114. In one embodiment, the comparison distance module 308 identifies the reference intranode distance as the intranode distance having the largest magnitude (e.g., $DI_{2\_3}$ in FIG. 4B). It should be understood that the comparison distance module 308 may employ other arithmetic representations of the intranode distances to identify the reference intranode distance and is not limited to the example described herein, such as a mean (e.g., the mean may be employed when the target device distances indicate the target device 20 may be inside of the vehicle 10), median, average of nearest neighbors, among other arithmetic representations.

In one embodiment, based on a comparison between the threshold comparison distance and the target device distances, the node characteristic module 310 assigns each of the vehicle sensor nodes 114 to one of a reflecting vehicle sensor node set (hereinafter referred to as "the reflecting set") and a non-reflecting vehicle sensor node set (hereinafter referred to as "the non-reflecting set"). That is, a vehicle sensor node provided in the reflecting set may have received a signal from the target device 120 that is reflected by the reflective object 130, and a vehicle sensor node provided in the non-reflecting set may have received a signal from the target device 120 that is not reflected by the reflective object 130. As an example and as shown in FIG. 4A, the node characteristic module 310 determines, during a ranging session and for the vehicle sensor node 114*a*, whether the given target device distance (i.e., target device distance $D_1$) is greater than the threshold comparison distance (e.g., the sum of reference target device distance $D_4$, the reference intranode distance $DI_{2\_3}$, and the predetermined error distance target distance). If the given target device distance is greater than the threshold comparison distance, the reflective objects 130 may be the cause of the abnormally large distance value, and as such, the node characteristic module 310 assigns the vehicle sensor node 114*a* associated with the given target device distance to the reflecting set. In one embodiment, if the given target device distance is less than the threshold comparison distance, the given target device distance may not be associated with a reflection, and as such, the node characteristic module 310 assigns the vehicle sensor node 114*a* to the non-reflecting set. The node characteristic module 310 may iteratively repeat this process to assign each of the vehicle sensor nodes 114*b*, 114*c*, 114*d* to one of the reflecting and non-reflecting sets.

As another example, the node characteristic module 310 determines, for each vehicle sensor node 114*a* and during the ranging session, whether the given target device distance (e.g., target device distance $D_1$) is less than the reference target device distance (e.g., target device distance $D_4$ associated with vehicle sensor node 114*d*). If the given target device distance is less than the reference target device distance (e.g., the reflective objects 130 may be causing the vehicle sensor node 114*a* to generate abnormally low distance values), the node characteristic module 310 assigns the vehicle sensor node 114*a* to the reflecting set. In one embodiment, if the given target device distance is greater than the reference target device distance (e.g., the reflective objects 130 may not be causing the vehicle sensor node 114*a* to generate abnormally low distance values), the node characteristic module 310 assigns the vehicle sensor node 114*a* to the non-reflecting set. The node characteristic module 310 may iteratively repeat this process to assign each of the vehicle sensor nodes 114*b*, 114*c*, and 114*d* to one of the reflecting and non-reflecting sets.

As an additional example, the node characteristic module 310 determines, for the vehicle sensor node 114*a* and during the ranging session, whether the given target device distance (i.e., target device distance $D_1$) is less than the reference target device distance or greater than the threshold comparison distance. If the given target device distance is less than the reference target device distance or greater than the threshold comparison distance, the node characteristic module 310 assigns the vehicle sensor node 114*a* to the reflecting set. Otherwise, if the given target device distance is greater than the reference target device distance and less than the threshold comparison distance, the node characteristic module 310 assigns the vehicle sensor node 114*a* to the non-reflecting set.

In one embodiment, the localization module 312 is configured to determine a positional characteristic of the target device 120 based on one or more target device distances associated with the one or more vehicle sensor nodes of the non-reflecting set. As an example, the localization module 312 triangulates the target device distances to determine a location of the target device 120, a trajectory of the target device 120, and/or the distance between the target device 120 and the vehicle 110 (as the positional characteristic). It should be understood that the localization module 312 may employ other known routines to determine the positional characteristic of the target device 120 and is not limited to the example described herein.

In one embodiment, the control module 314 is configured to selectively broadcast a command to control the vehicle 110 based on the positional characteristic of the target device 120. As an example, the control module 314 provides access to one or more vehicle functions when the positional characteristic of the target device 120 satisfies a positional characteristic condition (e.g., the control module 314 instructs the vehicle 110 to unlock doors, start the vehicle 110, activate a climate control system of the vehicle 110, and/or control a lighting system of the vehicle 110 when the distance between the target device 120 and the vehicle 110 is less than a threshold value). In one embodiment, the control module 314 initiates a localization routine when the positional characteristic of the target device 120 satisfies the positional characteristic condition. As an example, the vehicle 110 displays navigation and orientation instructions to properly position itself relative to a wireless charging station (as the target device 120) when the target device 120 is within a predefined radius of the vehicle 110. It should be understood that the control module 314 may perform other types of localization routines and/or provide access to other types of vehicle functions and are not limited to the examples described herein.

Referring to FIG. 5, a flowchart illustrating an example routine 500 for localizing the target device 120 relative to the vehicle 110 is shown. At 504, the TDD module 118 determines a plurality of target device distances between the vehicle sensor nodes 114 and the target device 120. At 508, the TDD module 118 identifies a reference target device distance from among the target device distances based on a magnitude of the target device distances. At 512, the TDD module 118 determines a threshold comparison distance based on the reference target device distance, the reference intranode distance, and the predetermined error distance. At 516, the TDD module 118 assigns the vehicle sensor nodes 114 to one of a reflecting vehicle sensor node set and a non-reflecting vehicle sensor node set based on a comparison between the threshold comparison distance and the plurality of target device distances. At 520, the TDD module 118 determines a positional characteristic of the target device 120 based on one or more target device distances associated with one or more vehicle sensor nodes 114 from among the non-reflecting vehicle sensor node set. At 524, the TDD module 118 broadcasts a command to control the vehicle 110 based on the positional characteristic of the target device 120.

Referring to FIG. 6, a flowchart illustrating an example routine 600 for localizing the target device 120 relative to the vehicle 110 is shown. At 602, the TDD module 118 obtains a reference intranode distance from among a plurality of intranode distances associated with the vehicle sensor nodes 114. At 604, the TDD module 118 determines a plurality of target device distances between the vehicle sensor nodes 114 and the target device 120. At 608, the TDD module 118 identifies a reference target device distance from among the target device distances based on a magnitude of the target device distances. At 612, the TDD module 118 determines a threshold comparison distance based on the reference target device distance, the reference intranode distance, and the predetermined error distance. At 616, the TDD module 118 assigns the vehicle sensor nodes 114 to one of a reflecting vehicle sensor node set and a non-reflecting vehicle sensor node set based on a comparison between the threshold comparison distance and the plurality of target device distances. At 620, the TDD module 118 determines a positional characteristic of the target device 120 based on one or more target device distances associated with one or more vehicle sensor nodes 114 from among the non-reflecting vehicle sensor node set. At 624, the TDD module 118 broadcasts a command to control the vehicle 110 based on the positional characteristic of the target device 120.

Referring to FIG. 7, a flowchart illustrating an example routine 700 for localizing the target device 120 relative to the vehicle 110 is shown. At 704, the TDD module 118 determines a plurality of target device distances between the vehicle sensor nodes 114 and the target device 120. At 708, the TDD module 118 identifies a reference target device distance from among the target device distances based on a magnitude of the target device distances. At 712, the TDD module 118 determines a threshold comparison distance based on the reference target device distance, the reference intranode distance, and the predetermined error distance.

At 716, the TDD module 118 selects the first vehicle sensor node, and at 720, determines whether the given target device distance is greater than the threshold comparison distance. If the given target device distance is greater than the threshold comparison distance, the routine 700 proceeds to 728. Otherwise, if the given target device distance is less than the threshold comparison distance, the routine 700 proceeds to 724.

At 724, the TDD module 118 determines whether the given target device distance is less than the reference target device distance. If the given target device distance is less than the reference target device distance, the routine 700 proceeds to 728. Otherwise, if the given target device distance is greater than the reference target device distance, the routine 700 proceeds to 732. At 728, the TDD module assigns the vehicle sensor node to the reflecting set and then proceeds to 736. At 732, the TDD module assigns the vehicle sensor node to the non-reflecting set and then proceeds to 736.

At 736, the TDD module 118 determines whether there are additional vehicle sensor nodes 114. If so, the routine 700 proceeds to 740, where the TDD module 118 selects the next vehicle sensor node 114 and proceeds to 720. If no vehicle sensor nodes 114 remain, the routine 700 proceeds to 744, where the TDD module 118 determines the positional characteristic of the target device 120 based on the target device distances output by the non-reflecting set. At 748, the TDD module 118 controls the vehicle 110 based on the positional characteristic. While the routine 700 illustrates the comparison of the target device distance to the threshold comparison distance and the reference target device distance at 720 and 724, respectively, it should be understood that 720 or 724 may not be employed in variations of the routine 700.

Referring to FIG. 8, an environment 800 is shown and generally includes a speaker system 810, a target device 820, and one or more reflective objects 830. In one embodiment, the speaker system 810 includes speakers 812*a*, 812*b*, 812*c*, 812*d* (collectively referred to hereinafter as "speakers 812"), speaker sensor nodes 814*a*, 814*b*, 814*c*, 814*d* (collectively referred to hereinafter as "speaker sensor nodes 814") provided at each speaker 812, and a speaker control module 818. In one form, the speakers 812 and the speaker control module 818 are communicably coupled using a wired or a wireless communication protocol (e.g., a Bluetooth®-type protocol, a cellular protocol, a wireless fidelity (Wi-Fi)-type protocol, a near-field communication (NFC) protocol, a UWB protocol, among others).

The speakers 812 may be provided by various known audio electronic circuits and networks that are configured to output audio data based on received and/or generated electrical signals. The speaker sensor nodes 814 are similar to the vehicle sensor nodes 114 described above, and the speaker control module 818 is similar to the TDD module 118 described above. The target device 820 is similar to the target device 120 and may be provided by, for example, a remote controller device configured to control the operation of the speakers 812. However, in this embodiment, the TDD module 118 employs the mean of the intranode distances of the speaker sensor nodes 814 as the reference intranode distance as opposed to the largest intranode distance due to the target device 820 being located within an area defined by the speakers 812 and the speaker sensor nodes 814. Accordingly, the dynamic adjustment of the positional characteristic-based audio settings of the speakers 812 (e.g., a volume, bass, among others) are more accurately provided by mitigating the reflections caused by the one or more reflective objects 830.

Based on the foregoing, the following provides a general overview of the present disclosure and is not a comprehensive summary.

In a first embodiment A1, a method includes for localizing a target device relative to a vehicle includes determining a plurality of target device distances between a plurality of vehicle sensor nodes of a vehicle and the target device, identifying a reference target device distance from among the plurality of target device distances based on a magnitude of the plurality of target device distances, and determining a threshold comparison distance based on the reference target device distance, a reference intranode distance, and a predetermined error distance. The method includes assigning the plurality of vehicle sensor nodes to one of a reflecting vehicle sensor node set and a non-reflecting vehicle sensor node set based on a comparison between the threshold comparison distance and the plurality of target device distances, determining a positional characteristic of the target device based on one or more target device distances associated with one or more vehicle sensor nodes from among the non-reflecting vehicle sensor node set, and broadcasting a command to control the vehicle based on the positional characteristic of the target device.

In a second embodiment A2, which may include the first embodiment A1, the method includes determining a plurality of intranode distances between the plurality of vehicle sensor nodes and identifying the reference intranode distance from among the plurality of intranode distances based on a magnitude of the plurality of intranode distances.

In a third embodiment A3, which may include any combination of the first through second embodiments A1-A2, the threshold comparison distance is further based on a sum of the reference intranode distance, the reference target device distance, and the predetermined error distance.

In a fourth embodiment A4, which may include any combination of the first through third embodiments A1-A3, assigning the plurality of vehicle sensor nodes to one of the reflecting vehicle sensor node set and the non-reflecting vehicle sensor node set based on the comparison between the threshold comparison distance and the plurality of target device distances further comprises: determining, for a given vehicle sensor node from among the plurality of vehicle sensor nodes, whether a given target device distance from among the plurality of target device distances is greater than the threshold comparison distance, where the given target device distance is associated with the given vehicle sensor node; and assigning the given vehicle sensor node to the reflecting vehicle sensor node set in response to the given target device distance being greater than the threshold comparison distance.

In a fifth embodiment A5, which may include any combination of the first through fourth embodiments A1-A4, the method further includes assigning the given vehicle sensor node to the non-reflecting vehicle sensor node set in response to the given target device distance being less than the threshold comparison distance.

In a sixth embodiment A6, which may include any combination of the first through fifth embodiments A1-A5, assigning the plurality of vehicle sensor nodes to one of the reflecting vehicle sensor node set and the non-reflecting vehicle sensor node set based on the comparison between the threshold comparison distance and the plurality of target device distances further comprises: determining, for a given vehicle sensor node from among the plurality of vehicle sensor nodes, whether a given target device distance from among the plurality of target device distances is less than the reference target device distance, where the given target device distance is associated with the given vehicle sensor node; and assigning the given vehicle sensor node to the reflecting vehicle sensor node set in response to the given target device distance being less than the reference target device distance.

In a seventh embodiment A7, which may include any combination of the first through sixth embodiments A1-A6, the method further includes assigning the given vehicle sensor node to the non-reflecting vehicle sensor node set in response to the given target device distance being greater than the reference target device distance.

In an eighth embodiment A8, which may include any combination of the first through third embodiments A1-A3, assigning the plurality of vehicle sensor nodes to one of the reflecting vehicle sensor node set and the non-reflecting vehicle sensor node set based on the comparison between the threshold comparison distance and the plurality of target device distances further comprises: initiating a ranging session; determining, during the ranging session and for a given vehicle sensor node from among the plurality of vehicle sensor nodes, whether a given target device distance from among the plurality of target device distances is one of greater than the threshold comparison distance and less than the reference target device distance, where the given target device distance is associated with the given vehicle sensor node; and assigning the given vehicle sensor node to the reflecting vehicle sensor node set in response to the given target device distance being one of less than the reference target device distance and greater than the threshold comparison.

In a ninth embodiment A9, which may include any combination of the first through eighth embodiments A1-A8, the positional characteristic of the target device includes a distance between the target device and the vehicle, a trajectory of the target device, a location of the target device, or a combination thereof.

In a tenth embodiment A10, which may include any combination of the first through ninth embodiments A1-A9, the plurality of vehicle sensor nodes includes a plurality of ultra-wide band (UWB) sensors.

In an eleventh embodiment A11, which may include any combination of the first through tenth embodiments A1-A10, the method includes controlling the vehicle based on the positional characteristic of the target device, where controlling the vehicle based on the positional characteristic of the target device further comprises providing access to one or more vehicle functions of the vehicle when the positional characteristic of the target device satisfies a positional characteristic condition.

In a twelfth embodiment A12, which may include any combination of the first through eleventh embodiments A1-A11, the method includes controlling the vehicle based on the positional characteristic of the target device, where controlling the vehicle based on the positional characteristic of the target device further comprises performing a localization routine based on the positional characteristic of the target device.

In a thirteenth embodiment A13, a system for localizing a target device includes a processor and a nontransitory computer-readable medium including instructions that are executable by the processor. The instructions include obtaining a reference intranode distance from among a plurality of intranode distances associated with a plurality of vehicle sensor nodes of a vehicle, determining a plurality of target device distances between the plurality of vehicle sensor nodes and the target device, identifying a reference target device distance from among the plurality of target device distances based on a magnitude of the plurality of target device distances, and determining a threshold comparison distance based on the reference target device distance, the reference intranode distance, and a predetermined error distance. The instructions include assigning the plurality of vehicle sensor nodes to one of a reflecting vehicle sensor node set and a non-reflecting vehicle sensor node set based on a comparison between the threshold comparison distance and the plurality of target device distances, determining a positional characteristic of the target device based on one or more target device distances associated with one or more vehicle sensor nodes from among the non-reflecting vehicle sensor node set, and broadcasting a command to control the vehicle based on the positional characteristic of the target device.

In a fourteenth embodiment A14, which may include the thirteenth embodiment A13, the threshold comparison distance is further based on a sum of the reference intranode distance, the reference target device distance, and the predetermined error distance.

In a fifteenth embodiment A15, which may include any combination of the thirteenth through fourteenth embodiments A13-A14, the instructions for assigning the plurality of vehicle sensor nodes to one of the reflecting vehicle sensor node set and the non-reflecting vehicle sensor node set based on the comparison between the threshold comparison distance and the plurality of target device distances further comprise: determining, for a given vehicle sensor node from among the plurality of vehicle sensor nodes, whether a given target device distance from among the plurality of target device distances is greater than the threshold comparison distance, where the given target device distance is associated with the given vehicle sensor node, and assigning the given vehicle sensor node to the reflecting vehicle sensor node set in response to the given target device distance being greater than the threshold comparison distance.

In a sixteenth embodiment A16, which may include any combination of the thirteenth through fifteenth embodiments A13-A15, the instructions for assigning the plurality of vehicle sensor nodes to one of the reflecting vehicle sensor node set and the non-reflecting vehicle sensor node set based on the comparison between the threshold comparison distance and the plurality of target device distances further comprise: determining, for a given vehicle sensor node from among the plurality of vehicle sensor nodes, whether a given target device distance from among the plurality of target device distances is less than the reference target device distance, where the given target device distance is associated with the given vehicle sensor node; and assigning the given vehicle sensor node to the reflecting vehicle sensor node set in response to the given target device distance being less than the reference target device distance.

In a seventeenth embodiment A17, a method including obtaining a reference intranode distance from among a plurality of intranode distances associated with a plurality of vehicle sensor nodes of a vehicle, determining a plurality of target device distances between the plurality of vehicle sensor nodes and the target device, identifying a reference target device distance from among the plurality of target device distances based on a magnitude of the plurality of target device distances, and determining a threshold comparison distance based on the reference target device distance, the reference intranode distance, and a predetermined error distance. The method includes assigning the plurality of vehicle sensor nodes to one of a reflecting vehicle sensor node set and a non-reflecting vehicle sensor node set based on a comparison between the threshold comparison distance and the plurality of target device distances, determining a positional characteristic of the target device based on one or more target device distances associated with one or more vehicle sensor nodes from among the non-reflecting vehicle sensor node set, and broadcasting a command to control the vehicle based on the positional characteristic of the target device.

In an eighteenth embodiment A18, which may include the seventeenth embodiment A17, assigning the plurality of vehicle sensor nodes to one of the reflecting vehicle sensor node set and the non-reflecting vehicle sensor node set based on the comparison between the threshold comparison distance and the plurality of target device distances further comprises: initiating a ranging session; determining, during the ranging session and for a given vehicle sensor node from among the plurality of vehicle sensor nodes, whether a given target device distance from among the plurality of target device distances is one of greater than the threshold comparison distance and less than the reference target device distance, where the given target device distance is associated with the given vehicle sensor node; and assigning the given vehicle sensor node to the reflecting vehicle sensor node set in response to the given target device distance being one of less than the reference target device distance and greater than the threshold comparison.

In a nineteenth embodiment A19, which may include any combination of the seventeenth through eighteenth embodiments A17-A18, the method includes controlling the vehicle based on the positional characteristic of the target device, where controlling the vehicle based on the positional characteristic of the target device further comprises providing access to one or more vehicle functions of the vehicle when the positional characteristic of the target device satisfies a positional characteristic condition.

In a twentieth embodiment A20, which may include any combination of the seventeenth through nineteenth embodiments A17-A19, the method includes controlling the vehicle based on the positional characteristic of the target device, where controlling the vehicle based on the positional characteristic of the target device further comprises performing a localization routine based on the positional characteristic of the target device.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

In the figures, the direction of an arrow, as indicated by the arrowhead, generally demonstrates the flow of information (such as data or instructions) that is of interest to the illustration. For example, when element A and element B exchange a variety of information, but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, the term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

What is claimed is:

1. A method for localizing a target device relative to a vehicle, the method comprising:
   determining a plurality of target device distances between a plurality of vehicle sensor nodes of the vehicle and the target device;
   identifying a reference target device distance from among the plurality of target device distances based on a magnitude of the plurality of target device distances;
   determining a threshold comparison distance based on the reference target device distance, a reference intranode distance, and a predetermined error distance;
   assigning the plurality of vehicle sensor nodes to one of a reflecting vehicle sensor node set and a non-reflecting vehicle sensor node set based on a comparison between the threshold comparison distance and the plurality of target device distances, wherein measurements from one or more vehicle sensor nodes from among the non-reflecting vehicle sensor node set are free of distortions associated with a reflective object, and wherein measurements from one or more vehicle sensor nodes from among the reflecting vehicle sensor node set are subject to distortions associated with the reflective object;
   determining a positional characteristic of the target device based on one or more target device distances associated with the one or more vehicle sensor nodes from among the non-reflecting vehicle sensor node set; and
   broadcasting a command to control the vehicle based on the positional characteristic of the target device.

2. The method of claim 1 further comprising:
   determining a plurality of intranode distances between the plurality of vehicle sensor nodes; and
   identifying the reference intranode distance from among the plurality of intranode distances based on a magnitude of the plurality of intranode distances.

3. The method of claim 1, wherein the threshold comparison distance is further based on a sum of the reference intranode distance, the reference target device distance, and the predetermined error distance.

4. The method of claim 1, wherein assigning the plurality of vehicle sensor nodes to one of the reflecting vehicle sensor node set and the non-reflecting vehicle sensor node set based on the comparison between the threshold comparison distance and the plurality of target device distances further comprises:
   determining, for a given vehicle sensor node from among the plurality of vehicle sensor nodes, whether a given target device distance from among the plurality of target device distances is greater than the threshold comparison distance, wherein the given target device distance is associated with the given vehicle sensor node; and
   assigning the given vehicle sensor node to the reflecting vehicle sensor node set in response to the given target device distance being greater than the threshold comparison distance.

5. The method of claim 4 further comprising assigning the given vehicle sensor node to the non-reflecting vehicle sensor node set in response to the given target device distance being less than the threshold comparison distance.

6. The method of claim 1, wherein assigning the plurality of vehicle sensor nodes to one of the reflecting vehicle sensor node set and the non-reflecting vehicle sensor node set based on the comparison between the threshold comparison distance and the plurality of target device distances further comprises:
   determining, for a given vehicle sensor node from among the plurality of vehicle sensor nodes, whether a given target device distance from among the plurality of target device distances is less than the reference target device distance, wherein the given target device distance is associated with the given vehicle sensor node; and
   assigning the given vehicle sensor node to the reflecting vehicle sensor node set in response to the given target device distance being less than the reference target device distance.

7. The method of claim 6 further comprising assigning the given vehicle sensor node to the non-reflecting vehicle sensor node set in response to the given target device distance being greater than the reference target device distance.

8. The method of claim 1, wherein assigning the plurality of vehicle sensor nodes to one of the reflecting vehicle sensor node set and the non-reflecting vehicle sensor node set based on the comparison between the threshold comparison distance and the plurality of target device distances further comprises:
   initiating a ranging session;
   determining, during the ranging session and for a given vehicle sensor node from among the plurality of vehicle sensor nodes, whether a given target device distance from among the plurality of target device distances is one of greater than the threshold comparison distance and less than the reference target device distance, wherein the given target device distance is associated with the given vehicle sensor node; and
   assigning the given vehicle sensor node to the reflecting vehicle sensor node set in response to the given target device distance being one of less than the reference target device distance and greater than the threshold comparison.

9. The method of claim 1, wherein the positional characteristic of the target device includes a distance between the target device and the vehicle, a trajectory of the target device, a location of the target device, or a combination thereof.

10. The method of claim 1, wherein the plurality of vehicle sensor nodes include a plurality of ultra-wide band (UWB) sensors.

11. The method of claim 1 further comprising controlling the vehicle based on the positional characteristic of the target device, wherein controlling the vehicle based on the positional characteristic of the target device further comprises providing access to one or more vehicle functions of the vehicle when the positional characteristic of the target device satisfies a positional characteristic condition.

12. The method of claim 1 further comprising controlling the vehicle based on the positional characteristic of the target device, wherein controlling the vehicle based on the positional characteristic of the target device further comprises performing a localization routine based on the positional characteristic of the target device.

13. A system for localizing a target device relative to a vehicle, the system comprising:
   a processor; and
   a nontransitory computer-readable medium including instructions that are executable by the processor, wherein the instructions include:

obtaining a reference intranode distance from among a plurality of intranode distances associated with a plurality of vehicle sensor nodes of the vehicle;

determining a plurality of target device distances between the plurality of vehicle sensor nodes and the target device;

identifying a reference target device distance from among the plurality of target device distances based on a magnitude of the plurality of target device distances;

determining a threshold comparison distance based on the reference target device distance, the reference intranode distance, and a predetermined error distance;

assigning the plurality of vehicle sensor nodes to one of a reflecting vehicle sensor node set and a non-reflecting vehicle sensor node set based on a comparison between the threshold comparison distance and the plurality of target device distances, wherein measurements from one or more vehicle sensor nodes from among the non-reflecting vehicle sensor node set are free of distortions associated with a reflective object, and wherein measurements from one or more vehicle sensor nodes from among the reflecting vehicle sensor node set are subject to distortions associated with the reflective object;

determining a positional characteristic of the target device based on one or more target device distances associated with the one or more vehicle sensor nodes from among the non-reflecting vehicle sensor node set; and broadcasting a command to control the vehicle based on the positional characteristic of the target device.

14. The system of claim 13, wherein the threshold comparison distance is further based on a sum of the reference intranode distance, the reference target device distance, and the predetermined error distance.

15. The system of claim 13, wherein the instructions for assigning the plurality of vehicle sensor nodes to one of the reflecting vehicle sensor node set and the non-reflecting vehicle sensor node set based on the comparison between the threshold comparison distance and the plurality of target device distances further comprise:

determining, for a given vehicle sensor node from among the plurality of vehicle sensor nodes, whether a given target device distance from among the plurality of target device distances is greater than the threshold comparison distance, wherein the given target device distance is associated with the given vehicle sensor node; and assigning the given vehicle sensor node to the reflecting vehicle sensor node set in response to the given target device distance being greater than the threshold comparison distance.

16. The system of claim 13, wherein the instructions for assigning the plurality of vehicle sensor nodes to one of the reflecting vehicle sensor node set and the non-reflecting vehicle sensor node set based on the comparison between the threshold comparison distance and the plurality of target device distances further comprise:

determining, for a given vehicle sensor node from among the plurality of vehicle sensor nodes, whether a given target device distance from among the plurality of target device distances is less than the reference target device distance, wherein the given target device distance is associated with the given vehicle sensor node; and assigning the given vehicle sensor node to the reflecting vehicle sensor node set in response to the given target device distance being less than the reference target device distance.

17. A method for localizing a target device relative to a vehicle, the method comprising:

obtaining a reference intranode distance from among a plurality of intranode distances associated with a plurality of vehicle sensor nodes of the vehicle;

determining a plurality of target device distances between the plurality of vehicle sensor nodes and the target device;

identifying a reference target device distance from among the plurality of target device distances based on a magnitude of the plurality of target device distances;

determining a threshold comparison distance based on the reference target device distance, the reference intranode distance, and a predetermined error distance;

assigning the plurality of vehicle sensor nodes to one of a reflecting vehicle sensor node set and a non-reflecting vehicle sensor node set based on a comparison between the threshold comparison distance and the plurality of target device distances, wherein measurements from one or more vehicle sensor nodes from among the non-reflecting vehicle sensor node set are free of distortions associated with a reflective object, and wherein measurements from one or more vehicle sensor nodes from among the reflecting vehicle sensor node set are subject to distortions associated with the reflective object;

determining a positional characteristic of the target device based on one or more target device distances associated with the one or more vehicle sensor nodes from among the non-reflecting vehicle sensor node set; and broadcasting a command to control the vehicle based on the positional characteristic of the target device.

18. The method of claim 17, wherein assigning the plurality of vehicle sensor nodes to one of the reflecting vehicle sensor node set and the non-reflecting vehicle sensor node set based on the comparison between the threshold comparison distance and the plurality of target device distances further comprises:

initiating a ranging session;

determining, during the ranging session and for a given vehicle sensor node from among the plurality of vehicle sensor nodes, whether a given target device distance from among the plurality of target device distances is one of greater than the threshold comparison distance and less than the reference target device distance, wherein the given target device distance is associated with the given vehicle sensor node; and assigning the given vehicle sensor node to the reflecting vehicle sensor node set in response to the given target device distance being one of less than the reference target device distance and greater than the threshold comparison.

19. The method of claim 17 further comprising controlling the vehicle based on the positional characteristic of the target device, wherein controlling the vehicle based on the positional characteristic of the target device further comprises providing access to one or more vehicle functions of the vehicle when the positional characteristic of the target device satisfies a positional characteristic condition.

20. The method of claim 17 further comprising controlling the vehicle based on the positional characteristic of the target device, wherein controlling the vehicle based on the positional characteristic of the target device further comprises performing a localization routine based on the positional characteristic of the target device.

\* \* \* \* \*